United States Patent
Wurtman et al.

(10) Patent No.: US 7,011,857 B2
(45) Date of Patent: Mar. 14, 2006

(54) WEIGHT LOSS COMPOSITIONS AND METHODS FOR INDIVIDUALS WHO MAY HAVE GASTRIC HYPERACIDITY

(75) Inventors: Judith J. Wurtman, Boston, MA (US); Richard J. Wurtman, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 246 days.

(21) Appl. No.: 10/096,108

(22) Filed: Mar. 13, 2002

(65) Prior Publication Data

US 2003/0039739 A1 Feb. 27, 2003

Related U.S. Application Data

(60) Provisional application No. 60/275,127, filed on Mar. 13, 2001.

(51) Int. Cl.
*A23L 1/0522* (2006.01)
*A23L 1/09* (2006.01)

(52) U.S. Cl. .............................. 426/72; 426/73; 426/74; 426/804; 426/808; 426/810

(58) Field of Classification Search ................. 426/72, 426/73, 74, 804, 808, 810
See application file for complete search history.

(56) References Cited

U.S. PATENT DOCUMENTS

| | | | |
|---|---|---|---|
| 4,045,589 A | * | 8/1977 | Petrowski et al. .......... 426/609 |
| 5,254,357 A | | 10/1993 | Langner |
| 5,498,435 A | | 3/1996 | Hosoda et al. |
| 5,595,772 A | * | 1/1997 | Wurtman et al. .............. 426/2 |
| 5,612,320 A | * | 3/1997 | Wurtman et al. ............. 514/54 |
| 5,688,547 A | | 11/1997 | Ritchey et al. |
| 5,760,014 A | | 6/1998 | Wurtman et al. |

OTHER PUBLICATIONS

Fisher et al., "Obesity Correlates with Gastroesophageal Reflux," Digestive Diseases and Sciences, vol. 44, No. 11 (Nov. 1999), pp. 2290-2294.

Wisen et al., "Gastric Secretion in Massive Obesity," Digestive Diseases and Sciences, vol. 32, No. 9 (Sep. 1987), pp. 968-972.

Flechtner-Mors et al., "Metabolic and Weight Loss Effects of Long-Term Dietary Intervention in Obese Patients: Four-Year Results," *Obesity Research*, vol. 8, No. 5 (Aug. 2000), pp. 399-402.

Ditschuneit et al., "Metabolic and Weight-Loss Effects of a Long-Term Dietary Intervention in Obese Patients," *The American Journal of Clinical Nutrition*, vol. 69, No. 2 (Feb. 1999), pp. 198-204.

\* cited by examiner

*Primary Examiner*—Helen Pratt
(74) *Attorney, Agent, or Firm*—Pearl Cohen Zedek Latzer. LLP; Mark Cohen

(57) ABSTRACT

Compositions and methods of losing weight are described that are suitable for individuals susceptible to gastric hyperacidity or gastroesophageal reflux. The compositions include in part a snack food having two or more rapidly digestible carbohydrates, in which the foodstuff or an aqueous mixture of the foodstuff and water has a pH equal to or greater than about 6, and in which the snack is substantially protein-free. The method of weight loss suitable for an individual with gastric hyperacidity includes substantially limiting the individual's caloric intake to about 1400 calories or less for women and 1800 calories or less for men in which the caloric intake includes one or more substantially protein-free snack foodstuffs having two or more rapidly digestible carbohydrates, in which an aqueous mixture of the foodstuff with water has a pH equal to or greater than about 6 and in which the individual loses weight.

23 Claims, No Drawings

WEIGHT LOSS COMPOSITIONS AND METHODS FOR INDIVIDUALS WHO MAY HAVE GASTRIC HYPERACIDITY

RELATED APPLICATIONS

This application claims priority to U.S. Provisional Application No. 60/275,127, filed Mar. 13, 2001, which is incorporated herein by reference.

FIELD OF THE INVENTION

The present invention relates to an appetite suppressant and/or snack food composition and methods for inducing weight loss and/or preventing weight gain suitable for individuals who may have gastric hyperacidity.

BACKGROUND OF THE INVENTION

Individuals with gastric hyperacidity are restricted in choice of diet. For those who are obese or who need to control their weight for other reasons, such a restriction in food options makes desirable weight loss yet more difficult. Further, gastric hyperacidity and gastroesophageal reflux are thought to be associated with obesity, as the sensation of hyperacidity is often confused with that of hunger. Since eating relieves the discomfort, even if the person is not hungry, eating often occurs. Thus "false hunger" produced by the hyperacidity may cause many obese individuals to discontinue adherence to a calorie restricted diet. S"Patients with esophageal pH<4 for more than 5% of observed time weighed more than those with normal acid exposure." Fisher et al. Dig Dis Sci 1999; 44:2290, abstract only. Moreover, obese patients produce more gastric acid in response to pentagastrin than do normal-weight control individuals. Wisen et al. Dig Dis Sci 1987; 32: 968, abstract only.

Obesity remains a serious health concern in modern society and is highly correlated with medical problems including diabetes. Moreover medical science has linked obesity with cardiac problems, high blood pressure, and kidney ailments. Sixty-one percent of adult Americans are overweight and more than a quarter are obese according to the 1999 National Health and Nutrition Examination survey of the Center for Disease Control and Prevention. Obese individuals may also suffer psychologically under constant commercial media bombardment of "beautiful" people being skinny and svelte. Indeed, obese people often suffer a social stigma simply from their appearance.

Improvement in a sense of well-being and health is often associated with loss of excess weight. The anecdotal results are supported by studies of metabolic functions in individuals on weight loss protocols. Flechtner-Mors et al. Obesity Res 2000; 8:399. For example, both men and women have decreases in elevated insulin and glucose levels at three months after initiating a weight loss regimen and coincident with weight losses of about 8% and 7%, respectively. Ditschuneit et al. Am J Clin Nutr 1999; 69:198. Moreover, long term decreases in elevated insulin and glucose levels have been observed. Flechtner-Mores, supra. Both of these studies replaced one or two meals with a meal replacement and provided nutrition snack bars for snacks.

For both the medical and social disadvantages, overweight and obese individuals have long sought effective methods to lose their excess weight. While a combination of a reasonable diet and exercise may be best, it is not uncommon for individuals to subscribe to one diet plan after the next in a vain effort to lose weight. And, as anyone who has tried any of the numerous diet plans available has experienced, the craving for food while on a diet can be quite acute and the urge to stray from the dietary regimen constant. Hence, any one individual on a diet may not necessarily lose weight over the course of a diet and a population of individuals on a given diet may experience a very large range of weight change. Individuals suffering from gastric hyperacidity are particularly restricted in the varieties of food that they can consume.

For some individuals on a diet plan, a substitute for the commonly available "snack" food is an aid in weight loss. U.S. Pat. No. 5,595,772 to J. Wurtman and R. J. Wurtman titled "Composition and Methods for Losing Weight," discloses a snack composition "which may include maltodextrin (35 grams), dextrose (14.5 grams), Penplus UM Starch (3.0 grams), malic acid, fine granular (1.4 grams), H&R Orange (90 milligrams), WJ Yellow No. 6 (30 milligrams), Niacinamide (5.0 milligrams), pantothenate (2.5 milligrams), calcium (500 milligrams), and magnesium (200 milligrams). The snack composition may also contain added fiber (e.g. circa 10 grams of methylcellulose or the like)."

U.S. Pat. Nos. 5,760,014 and 5,612,320, both to J. Wurtman, J. L. Shear, and A. Kershman and both titled "Therapeutic carbohydrate blends useful for aiding premenstrual syndrome," a composition of 44.5 g dextrose, 3 g starch, 1.4 g malic acid, pH 2, 270 mL water, and orange flavoring.

However, for obese patients, a majority of which have signs and symptoms of gastric hyperacidity, too much exogenous acid is contraindicated.

SUMMARY OF THE INVENTION

Applicants have developped a snack foodstuff having a pH of 6 or greater. In some embodiments the pH is greater than about 6 but less than about 8. The snack foodstuff, which can be for consumption by an individual susceptible to having gastric hyperacidity or gastroesophageal reflux, comprises two or more rapidly digestible carbohydrates, which foodstuff or a mixture thereof with water has a pH equal to or greater than about 6, and which foodstuff is substantially free of protein. In one embodiment, the snack foodstuff further comprises one or more vitamins or minerals. The snack food an also be used to control stress-induced overeating, wherein the individual may or may not suffer from hyperacidity.

The snack foodstuff of the invention can be of several forms including liquid, suspension, powder, semi-solid, and solid. Semi-solid is meant to include custards, dessert puddings, thick creams, mousses, parfaits, yogurts, and sweetened gelatins. Without limiting to particular embodiments, the solid form can be prepared as a bar similar to a energy bar, a chip, a cookie, a cracker, pasta or a puffed material, e.g. popcorn or a rice-cake-like foodstuff. Some embodiments require the individual to dissolve, suspend, or rehydrate the snack foodstuff.

By "a pH equal to or greater than about 6," it is meant that the foodstuff, if a solution, has a pH equal to or greater than about 6, or else if the foodstuff is not liquid, then a solution or suspension of the foodstuff has a pH equal to or greater than about 6, or alternatively the pH is measured prior to making the ultimate form of the foodstuff by measuring the pH of the carbohydrate mixture. The pH of the carbohydrate mixture should be at least about 6 and, when the carbohydrates are incorporated into the foodstuff product, no additional acidic component is added, or else minimal acidic ingredients are added so that the pH does not become less than 6. In one aspect, the pH of the foodstuff is greater than about 6, but less than about 8.

In some embodiments, the snack foodstuff can be an appetite suppressant. In other embodiments, the snack foodstuff can be an aid to weight loss and/or weight control.

Moreover, Applicants have developed a method of weight loss for an individual comprising consuming a foodstuff comprising two or more rapidly digestible carbohydrates, which foodstuff is substantially free of protein, whereby the individual loses weight. The method is equally suitable for a subject having or susceptible to having, gastric hyperacidity. In a preferred embodiment, the method further comprises providing a diet plan in which a total caloric value is not more than about 1400 calories for women or 1800 calories for men, or a dietary amount for the particular individual, and in which one or more snack foodstuffs comprise two or more rapidly digestible carbohydrates; which foodstuff or a mixture thereof with water has a pH equal to or greater than about 6; and in which the subject having gastric hyperacidity loses weight. Individuals who are overweight but not obese can also benefit from the methods of treatment of the invention. The snack foodstuff is suitable for inclusion in a diet plan that includes breakfast, lunch, and/or dinner.

Another embodiment of the invention is a method of treating obesity that is suitable for a subject who could have, or actually do have, gastric hyperacidity in which the method comprises consuming one or more meals and one or more snack foodstuffs in which a total daily caloric value is a dietary amount, e.g., not more than about 1400, 1600, 1800, 2,000, 2,500 or 3,000 calories depending on the individual, in which the snack foodstuffs have a substantially protein-free mixture of one or more vitamins, and rapidly digestible carbohydrates including maltodextrin, dextrose, and starch; which foodstuff or a mixture thereof with water has a pH equal to or greater than about 6, in which some or all of the meals are prepared at home; and in which the subject having gastric hyperacidity loses weight. The method can equally be applied for the treatment of individuals who are overweight, but not technically obese, as well as a method for preventing weight gain.

Preferably, the meals and snacks of the method of the invention have a predetermined range of caloric and nutritional content. Most preferably, the traditional foods should be chosen according to guidelines specifying a fixed amount of protein and carbohydrate.

In accordance with the present invention, it has been surprisingly discovered that individuals suffering from gastric hyperacidity tolerate the compositions and methods of the invention quite well. Moreover, the dieting individual suffered less from carbohydrate craving, and recorded an increase in their self-reported vigor relative to overweight individuals consuming a control diet as shown in the examples below.

Also contemplated by the present invention is a method of treating gastric hyperacidity associated with obesity comprising consuming one or more replacement snacks as a substitute for a meal or a conventional snack, which snack or a mixture thereof with water has a pH equal to or greater than about 6, whereby gastric hyperacidity and/or gastroesophageal reflux is ameliorated. In another embodiment, the present invention is a method of treating gastroesophageal reflux, which can be acidic, comprising consuming one or more replacement snacks as a substitute for a meal or a conventional snack, which snack or a mixture thereof with water has a pH equal to or greater than about 6, whereby gastric hyperacidity and/or gastroesophageal reflux is ameliorated.

Another method of the invention is the enhancement of body weight control. The method of weight control comprises consumption of an appetite suppressant comprising a snack foodstuff comprising two or more rapidly digestible carbohydrates, which foodstuff or a mixture thereof with water has a pH equal to or greater than about 6, and which foodstuff is substantially free of protein. The individual desirous of maintaining body weight can consume one, two, three, or four portions of the snack foodstuff daily. The snack foodstuff is suitable for use by an individual who can have gastric hyperacidity, gastroesophageal reflux, gastric distress related to mild hiatus hernia, nausea associated with gastric hyperactivity, and the like.

Yet another embodiment of the present invention is a method of inhibiting the carbohydrate craving of an individual with gastric hyperacidity who is participating in a weight loss diet plan under guidelines specifying specific amounts of nutritious protein-rich and carbohydrate-rich foods, in which a snack foodstuff is a component.

In some embodiments, the snack food compositions and methods of losing weight can be tailored to individuals with gastric hyperacidity and can generally address a carbohydrate craving universally complained of by individuals on a diet, as well as increase the feeling of well being and self-reported vigor among these affected individuals. In this regard, the carbohydrate composition of the present invention may also be particularly suited for use in the treatment of overeating in individuals suffering from stress, PMS, menopausal symptoms, "winter blues", binge eating, smoking withdrawal, alcohol withdrawal, mild pain/itch (which is often associated with carbohydrate craving and weight gain), sideffects of various psychotropic drugs, and to promote sleep.

These and other objects in the present invention will become apparent to one of ordinary skill in the art, upon further consideration of the balance of the present disclosure, which is provided to further assist those interested in practicing the invention.

DETAILED DESCRIPTION OF THE INVENTION

The present invention is directed to compositions and methods for effecting weight loss such that individuals using the compositions and methods of the invention experience minimal carbohydrate craving. The invention is particularly suited to individuals who have, or could have, gastric hyperacidity, although it can be equally effective for individuals with normal or low levels of stomach acid. The invention is also suitable for individuals who desire to lose weight and also suffer occasional gastroesophageal reflux.

In one embodiment, the invention comprises a snack foodstuff for consumption by an individual with gastric hyperacidity or who could have gastric hyperacidity comprising two or more carbohydrates, which foodstuff, an aqueous suspension thereof or an aqueous solution thereof has a pH equal to or greater than about 6. The carbohydrates can be any rapidly digestible carbohydrates. The composition is also suitable for consumption by an individual who does not have gastric hyperacidity. The snack foodstuff is useful as a component of a weight loss regimen.

In one particular embodiment, the snack foodstuff comprises a pH buffer such that the final formulation has a pH of about 6 or greater. The selection of a pH buffer that would maintain the pH of the final formulation to about 6 or greater would be known to one of skill in the art depending on the formulation, but may be selected from sodium phosphate, potassium phosphate, sodium citrate, sodium malate, potassium adipate, sodium fumarate, potassium lactate, ammonium succinate, potassium tartrate, sodium ascorbate, potassium acetate, or sodium thylenediaminetetraacetic acid. The salts can be any salt form, including sodium, potassium, magnesium, calcium, ammonium, or tin. In an alternative formulation, no pH buffer is added, but little or no exogenous acid is added to the formulation such that the final formulation has a pH of about 6 or greater.

The foodstuff of the invention can, furthermore, comprise a fluid. The fluid in the foodstuff of the invention can be water, fruit juice, vegetable juice, soda (soda pop), diet soda, coffee, tea, or combinations thereof. The water can be spring water, purified water, mineral water, carbonated water, or tap water. The soda can also be bicarbonated water. In one particular embodiment, the aqueous mixture of the foodstuff of the invention with fluid has a pH greater than about 6 but less than about 8.

The snack foodstuff of the invention is preferably a powder, a beverage, a soup, a solid, a semi-solid, or a frozen confection. Suitable forms of the powder include a fine powder, a medium powder, and a coarse powder. Preferably the powder is free-flowing and readily mixable with water or other fluid. The powder form of the snack foodstuff can be mixed with a variety of fluids. Thus, for example, the powder form of the invention can be mixed with water, soda, diet soda, tea, coffee, fruit juice, diet fruit juice, flavored diet beverages, and the like. Preferably, the powder form of the invention is mixed with water or other fluid before drinking. The beverage can be a still beverage or a carbonated beverage, and moreover, can be a suspension, for example, a shake, frappe, or float. Carbonated beverages are preferably made without phosphoric acid, to permit a higher pH. Carbonated beverages as diluents are preferably used with buffer formulations of the composition, such that the final pH is greater than about 6. Both carbonated and non-carbonated beverages can be "diet" beverages made with low calorie or no-calorie sweetners, including saccharine, aspartame, dihydrochalcones, monellin, steviosides, glycyrrhizin, sorbitol, mannitol, maltitol, and others. The beverage can be an infusion or extract, including a tea or a coffee. The solid can be a bar, much like an energy bar or a candy bar; a chip, like a potato or corn chip in shape or texture; a baked good; a non-baked extruded food product; a puffed snack; a cracker; a cookie; in which the solid can be with or without embedded flavor nuggets such as nuts, fruits, or chocolate chips. The semi-solid snack foodstuff can be a custard, a dessert pudding, a thick cream, a mousse, a parfait, a yogurt, a jelly, a sweetened gelatin, and similar snacks. The frozen confection can be an "ice cream", an "ice milk", a sherbet, a flavored ice, and similar snacks, and can, optionally, include a wafer or cone, a stick, cup, or flavor nuggets such as nuts and candy sprinkles (a.k.a. "jimmies"). The frozen confection should be substantially free of protein, i.e., less than 0.5 g. The frozen confection can be formed into any of a variety of attractive shapes including cones, cups, bars, and sandwiches.

The snack foodstuff can include flavorants including, but not limited to sweet, salty, and bittersweet flavors. The flavorant can include any flavor not requiring an acid pH or which is known to exacerbate hyperacidity. Alternatively, a pH buffer may be used to ensure that the final formulation has a pH of about 6 or greater. The selection of a flavorant that alone or in combination with a pH buffer would maintain the pH of the final formulation to about 6 or greater would be known to one of skill in the art. More particularly, the flavors in the snack foodstuff can be fruit flavors, nut flavors, bean flavors (including coffee, vanilla, and chocolate), vegetable flavors, herb flavors (including tea), flower flavors (including rose and nasturtium), butter and cream flavors, caramel flavor, spice flavors, savory flavors, and meat flavors. Even flavors not usually associated with diet foods can be used, as long as the pH is maintained to about 6 or greater. The flavors can be natural, artificial, or both. Preferred flavor combinations are vanilla, chocolate and vanilla-fruit, such as orange or raspberry.

The composition can include natural and artificial colors as well known in the art.

In a preferred embodiment, a one-serving snack portion of the foodstuff of the invention comprises about 5 to 100 g of carbohydrate. In a more preferred embodiment, the one-serving snack portion comprises 15–100 g, more preferably 45–90 g and most preferably 40–60 g.

The carbohydrate component of the snack can comprise any readily digestible carbohydrate. In one embodiment of the invention, the carbohydrate does not include high-fructose corn syrup. In one preferred embodiment of the invention, the one-serving snack portion is about 30–40 g maltodextrin, about 10–18 g dextrose, about 1–5 g starch, and/or one or more vitamins. In a yet more preferred embodiment, a one snack portion of the foodstuff of the invention comprises about 35 g maltodextrin, about 14 g dextrose, about 3 g starch, and, optionally, one or more vitamins or minerals. A single serving of the snack foodstuff can optionally include 2 g of protein, preferably 1.5 g of protein. A single serving of the snack foodstuff can also optionally include 1–2 g of fat. Further, a single serving of the snack foodstuff can optionally include an aqueous portion consisting essentially of about 50 to 800 ml fluid, preferably 200 to 500 ml fluid. More preferably, a single serving of the snack foodstuff can include 350 to 450 ml of an aqueous fluid.

The snack foodstuff discovered by the inventors can further comprise soluble or insoluble fiber. Suitable sources of fiber include methylcellulose, psyllium, and bran from oats, corn, rice, barley, buckwheat, and/or wheat.

In another embodiment, the invention is a method of weight loss for an individual comprising consuming a foodstuff comprising two or more rapidly digestible carbohydrates, which foodstuff, an aqueous suspension thereof, or an aqueous solution thereof, has a pH equal to or greater than about 6, which foodstuff is substantially free of protein, whereby the individual loses weight. The method can further comprise substantially limiting the individual's caloric intake to about 1400 calories for a female individual or 1800 calories for a male individual depending on the individual. In a preferable embodiment, the invention is a method of weight loss for an individual comprising consuming a foodstuff comprising two or more rapidly digestible carbohydrates, which foodstuff, alone or combined with water, has a pH equal to or greater than about 6, which foodstuff is substantially free of protein, whereby the individual loses weight. A suitable ratio of the dry snack foodstuff to water is from about 1 to 1 to about 1 to 40, preferably about 1 to 5. The individual with gastric hyperacidity loses weight. The method is preferably applied to individuals who are overweight or obese. More preferably, the method is applied to individuals who have excess stomach acid, gastric hyperacidity, or reflux of stomach contents into the esophagus.

It is envisioned that in the method of the invention, on occasion the snack foodstuff can replace a meal in the weight loss regimen for an individual. Alternatively, the snack foodstuff can replace a conventional snack. The meaning of conventional snacks is well understood by nutritionists, and can include, without limitation, potato chips, crackers, candy bars, and sodas.

In the method of the invention, a preferable snack foodstuff is a combination of two or more readily digestible carbohydrates. Preferably, the snack foodstuff, or a solution of the snack foodstuff in water, or a suspension of the snack foodstuff in water has a pH equal to or greater than 6, where pH is understood to be the reciprocal of the log of the hydrogen ion concentration. The water can be ordinary tap water, distilled or purified water, or bottled water and should have a pH of about 7. In a preferred embodiment, the snack foodstuff of the method of the invention comprises about 30–40 g maltodextrin, about 10–18 g dextrose, about 1–5 g starch, and, optionally, one or more vitamins. In one embodiment, the snack food has about 35 g maltodextrin, about 14 g dextrose, about 3 g starch, and a vitamin. Any of a number of vitamins are suitable, including vitamins A, B1, B2, B6, B12, C, D, E, K, or combinations of these vitamins. Minerals can be used in the snack foodstuff in addition to, or to substitute for, vitamins. Suitable minerals include calcium, iron, magnesium, phosphate, manganese, chromium, molybdate, selenite, iodide, zinc, and sulfur.

The method of the invention can further comprise that meals are prepared at home. Alternatively, or additionally, the method can comprise that meals are prepared at a weight loss facility, or other facility used at times for nutrition control, including, but not limited to hospitals, clinics, and spas.

The method of weight loss can include a snack foodstuff that has a fluid component. The fluid can be water, fruit juice, vegetable juice, coffee, tea, or a naturally or artificially carbonated beverage. The fluid can be naturally or artificially sweetened. The fluids can optionally contain caffeine.

Another embodiment of the invention is a method of treating obesity suitable for a subject having gastric hyperacidity comprising providing a diet plan in which a total caloric value is less than about 1400 calories or more depending on the individual and comprising one or more, preferably two, snack foodstuffs having a substantially protein-free mixture of rapidly digestible carbohydrates; in which an aqueous mixture of the foodstuff with water has a pH greater than about 6; and in which the subject having gastric hyperacidity loses weight. Preferably, the snack foodstuff has one or more vitamins. It is preferable that the individual loses more than 0.5 kg body weight per month. It is yet more preferable that the individual loses more than 1 kg body weight per month. Obesity can be a body weight greater than 10% higher than optimal body weight. In an alternative, obesity can be a body weight greater than 20% higher than optimal body weight. According to the current BMI (Body Mass Index) standards, an index of 25–30 is considered overweight and an index of 30 or greater is considered obese.

Yet another embodiment of the invention is a method of treating obesity suitable for a subject having gastric hyperacidity comprising consuming one or more meals and one or more snack foodstuffs in which a total daily caloric value is less than about 1400 calories for women and 1800 calories for men, in which the snack foodstuffs have a substantially protein-free mixture of rapidly digestible carbohydrates; and in which a mixture of the foodstuff with water, or the foodstuff alone, has a pH greater than 6. In a preferred embodiment, the method of treating obesity further comprise that some or all of the meals are prepared at home, or, alternatively or additionally, at a weight loss center. In a yet more preferred embodiment, the subject having gastric hyperacidity loses weight.

Substantially protein-free preferably means that the ratio of carbohydrate to protein is at least 5 to 1, preferably 6 to 1, more preferably 10 to 1, and most preferably 20 to 1. A substantially protein-free serving means that each serving has less than 5 g of protein, preferably 2 grams of protein, even more preferably 1.5 g of protein, and most preferably, a substantially protein-free serving has less than one gram of protein. Even more preferably, a substantially protein-free serving has less than one-half gram of protein. Yet even more preferably, a substantially protein-free serving has less than one-eighth gram of protein. Most preferably, a substantially protein-free serving of the snack foodstuff has no measurable protein.

In particular, the compositions of the present invention promote weight loss by limiting the ratio of carbohydrate to protein in three daily meals and in one daily snack, preferably two daily snacks, within prescribed ranges. According to the present invention, the breakfast and lunch composition preferably has a relatively low carbohydrate:protein ratio, for example, 4 parts by weight carbohydrate to 3 parts by weight protein. The dinner composition, in contrast, contain a relatively high ratio of carbohydrate to protein, for example, 7 parts by weight carbohydrate to one part by weight protein. Lastly, the daily snack composition is comprised of complex and/or simple carbohydrates, and is substantially free of protein.

As used herein, the term "carbohydrate" encompasses both complex carbohydrates and simple sugars. Rapidly digestible carbohydrates are used by the body without extensive hydrolysis. Thus, rapidly digestible carbohydrates can include, but is not limited to simple sugars, monosaccharides, disaccharides, complex sugars, linear starches, branched chain starches, partially hydrolyzed starches, and hydrolyzed starches. Hydrolysis can be accomplished by any method known in the art, including acid hydrolysis, thermal hydrolysis, and enzymatic hydrolysis. Preferably, the carbohydrate is of a high glycemic index, such as maltodextrin, polycose (a synthetic polyglucose), dextrose, sucrose, or maltose, to name a few. Other sources of carbohydrate include but are not limited to, galactose, pregelatinized starch, hydroxyethyl starch, corn starch, fructose, corn syrup, corn syrup solids, molasses, honey, mannose, lactose, dextrin, and mixtures thereof. Rapidly digestible blends of carbohydrate can likewise be used. In particular, the rapidly digestible carbohydrate can be corn syrup, high fructose corn syrup, starch, corn starch, uncooked corn starch, high amylose starch, rice starch, potato starch, tapioca starch, sweet potato starch, yam starch, cassava starch, maltodextrin, invert sugar, honey, molasses, sucrose, fructose, lactose, glucose, dextrose, galactose, maltose, or combinations thereof.

Readily digestible carbohydrates are produced in many ways known to those skilled in the art. For example, maltodextrins are partial hydrolyzates of starches. Maltodextrins and other carbohydrates can be classified on the basis of dextrose equivalent (D.E.) values. Starch hydrolyzates having D.E. values up to about 20 are considered to be maltodextrins, while those having D.E. values above about 20 are considered to be corn syrups. Various methods of producing maltodextrins are well known in the art. The maltodextrins having a low D.E., generally are made by first liquefying native starch with an acid or an enzyme to a D.E. less than about 15, followed by enzymatic conversion, e.g., with bacterial alpha-amylase. Maltodextrins are first prepared in syrup form and then spray dried to a moisture content of 3 to 5 percent by weight.

Examples of carbohydrates which are constituted by polysaccharides or mixtures of mono-, di- and polysaccharides are corn syrup solids, various gums, such as xanthan gum, guar gum, carrageenan gum, arabic gum, locust bean gum and tragacanth gum, maltodextrins, glucose syrups, rice syrup, psyllium, pectin, corn starch (including chemically modified and/or pregelatinized corn starch), tapioca starch, rice starch, potato starch, wheat starch, arrowroot starch and cassava starch.

One of skill in the art will understand that the carbohydrate or blend of carbohydrates selected will depend on the various attributes of the ingredients. For example, different carbohydrates will provide energy more or less quickly and a judicious selection of same can contribute to balancing the delivery of carbohydrate calories to the consumer so that the energy provided is meted out over a period of time. Impacting also on the choice of carbohydrate ingredients is the desired flavor of the finished product. Different carbohydrates have different perceived sweetness. As examples, a D.E. of 10, corresponding to a maltodextrin, has a relatively low sweetness. In contrast, fructose has a very high perceived sweetness. In addition to the consideration of sweetness impact, the carbohydrate or carbohydrates must be chosen for "fit" into the flavor profile of the desired product. Finally, the carbohydrate or carbohydrates will be selected for functionality related to texture and processing characteristics of the desired nutritional composition; for example, modified corn starch will be selected for thickness in a cooked, ready-to-eat pudding. These and other factors in the selection of appropriate carbohydrates are within the knowledge of those skilled in the nutritional arts.

As used herein, the term "protein" includes any high quality protein derived from an animal or plant source, and does not include free or conjugated amino acids, amino acid derivatives, or oligopeptides. Proteins derived from animal foods such as dairy products or eggs are included in the meaning of "protein," including, but not limited to, whey, casein, or albumin.

Individuals can use the compositions and methods of the invention in a supervised environment, such as a weight loss center or spa, or equally well, can prepare meals at home and supplement the daily caloric intake with the snack foodstuff of the invention. As an example, the snack foodstuff can be a beverage, either prepared at home or at work from a premixed powder or concentrated liquid, or in ready-to-use form. In another preferred embodiment, the snack is a ready-to-drink beverage.

Preferably, the compositions of the present invention are provided in a package containing at least one snack composition, preferably two snack compositions. Breakfast, lunch or dinner compositions may also be provided in the package. Alternatively, the dinner meal may be composed of traditional foods in a given range of caloric and nutritional content. Preferably, the breakfast, lunch, and dinner meals are low in acidity. In a particular embodiment of the present invention, the daily caloric intake of the individual subscribing to the weight loss plan should not exceed about 3,000 calories, preferably about 2,500 calories, more preferably about 1800 calories, more preferably about 1600 calories, more preferably about 1200 calories, and most preferably about 1300–1400 calories for women and 1600–2000 calories for men, as long as the caloric intake is a dietary amount for the particular individual. The caloric intake can also be expressed by height, by age, by sex, by general activity level, or by other criteria suitable to adjust caloric intake to the individual's needs. For example, a preferable weight loss regime for a man 178 cm in height can be 1500 calories, whereas for a man 173 cm in height, 1400 calories can be suitable. Similarly, a preferable weight loss regime for a woman 173 cm in height can be 1400 calories, whereas for a woman 168 cm in height, 1300 calories can be suitable. One skilled in the art will understand how total caloric intake can be adjusted to the characteristics of the individual.

Each composition provided in the snack package may be further comprised of additional ingredients including, but not limited to, sources of fat, fiber, calcium, vitamins and other minerals. The compositions provided are preferably low in fat, however, with preferably less than 20% of the calories provided in the composition deriving from fat. The amount of fiber, such as methylcellulose, may also be adjusted, but preferably provides between about 10–25 grams of fiber per day. Likewise, other sources of soluble and insoluble fiber are suitable, including wheat, corn, rice, and oat bran, and psyllium.

Accordingly, it is preferred that a breakfast composition have a caloric content ranging from about 200–400 calories. The lunch and/or dinner composition having a caloric content ranging from about 300–500 calories, and the snack composition having a caloric content ranging from about 150–250 calories. Excluding the optional traditional dinner meal, the total number of calories provided in the package containing at least breakfast composition, at least one lunch composition, and at least one snack composition should preferably range from about 700 to about 1050 calories. In a specific embodiment of the present invention, the package should further include instructions for the range in the caloric and nutritional content of the optional traditional dinner meal.

The compositions of the present invention can be provided in any convenient form, including but not limited to powders, liquids, soups, food bars, snack crackers, snack chips, puddings, flavored gelatins, mousses, custards, and shakes. The compositions can be prepared with saturated, unsaturated, or polyunsaturated fats or oils if needed, or with oil substitutes, including Olestra™. Preferably, unsaturated oils are used for any fat. Natural and/or artificial flavorings can also be added, including the following flavors: almond, hazelnut, macadamia nut, chocolate, vanilla, strawberry, apple, rum, banana, orange, mocha, coffee, etc.

An important aspect of the present invention is the discovery that the breakfast and lunch meal compositions include most of the daily protein intake. Hence, because the meal compositions will tend to be high in protein, the meal compositions tend not to elevate the Tp/Lnaa ratio found in the plasma after consumption of the snack relative to the Tp/Lnaa ratio found in the plasma before consumption of the meal.

On the other hand, the dinner meal should indeed prevent a decrease in the post-consumption plasma levels of tryptophan relative to the plasma levels of large neutral amino acids (Tp/Lnaa ratio); that is, the dinner meal should maintain or elevate the post-consumption Tp/Lnaa ratio in the plasma relative to the pre-consumption Tp/Lnaa ratio, and the snack meals should elevate the Tp/Lnaa ratio relative to the pre-consumption levels. Preferably, the post-consumption plasma Tp/Lnaa ratio is elevated relative to the pre-consumption plasma Tp/Lnaa ratio by about 10% or more, more preferably by 15% or more, most preferably by about 20% to about 30% or more.

Hence, the breakfast and lunch compositions should provide about 40% or more of the daily protein intake, preferably about 50% or more of the daily protein intake, most preferably about 60% or more of the daily protein intake, and even more preferably up to about 100% of the daily protein intake. Therefore, consistent with the objective of the present invention, the non-breakfast meal compositions should maintain Tp/Lnaa ratios at a level to permit enhanced uptake of tryptophan into the brain after the consumption of the snack. Higher levels of tryptophan in the brain after the snack is consumed, in turn, enhances the synthesis of serotonin in the brain which provides an enhanced feeling of satisfaction, well being and ability to control further food intake.

Table 1, shown below, provides an example of the daily caloric and nutrient content contemplated by the present weight loss diet plan for a female individual.

TABLE 1

|  | Breakfast | Snack | Lunch | Snack | Dinner | Total* |
| --- | --- | --- | --- | --- | --- | --- |
| Calories | 250 | 180 | 350 | 180 | 450 | 1410(a) |
| Protein (g) | 10–15 | — | 25–30 | — | 10 | 45–55 |
| Carbohydrate (g) | 22–25 | 45 | 22–25 | 45 | 70 | 204–210 |
| Fat (g) | 1 | — | 3 | 1 | 9 | 14 |
| Fiber/Fruit (g) | 3 | — | 8 | — | + | 11+ |

*Vitamins and Minerals: to be provided as multi vitamin/mineral pill
+ based on food choices of subjects
(a) salad and no calorie vegetables not included As one can see, of the 45–55 total grams of protein provided daily, at least 40 g are consumed between the breakfast and lunch meals and no protein is provided by the snack. Accordingly, according to a preferred embodiment, the breakfast and lunch meal contribute the major portion of the daily protein, preferably about 80–90% of the daily protein intake, which can be distributed between both meals with the greater amount being consumed at lunch. In addition, the weight ratio of carbohydrate to protein in the lunch and dinner meals is about 4 to 1, preferably 5 to 1, most preferably 7 to 1 or greater. In a preferred embodiment, the dinner meal can be mainly carbohydrates (with vegetables), with 23% or less of the daily protein requirements. Further, for a male individual, the caloric intake is proportionally increased to 1800 calories daily, wherein about 60 g of protein is consumed between the breakfast and the lunch meals.

Table 2, shown below, lists the calorie and nutrient content of a control diet plan for a female individual which provides a total number of calories similar to that provided by the weight loss plan of the present invention. This control diet plan, typical of most commercially available diet plans, contains a carbohydrate to protein weight ratio no higher than about 3 to 1 and would provide most of the daily protein intake after breakfast.

TABLE 2

|  | Breakfast | Lunch | Snack | Dinner | Total |
| --- | --- | --- | --- | --- | --- |
| Calories | 205 | 327 | 207 | 568 | 1357 (a) |
| Protein (g) | 10 | 25 | 15 | 35 | 85 |
| Carbohydrate (g) | 30 | 50 | 30 | 80 | 190 |
| Fat (g) | 5 | 3 | 3 | 12 | 23 |
| Fiber (g) | 10 | 8 | — | + | 18+ |

*Vitamins and Minerals: to be provided as multi vitamin/mineral pill
+ based on food choices of subjects
(a) salad and no calorie vegetables not included Accordingly, a test of the pre-consumption and post-consumption Tp/Lnaa ratios of individuals subscribing to either the weight loss plan of the present invention or the control diet plan showed a marked difference in the post-consumption plasma Tp/Lnaa ratio relative to pre-consumption plasma levels only in individuals subscribing to the weight loss plan of the present invention.

Thus, a blood sample is taken from each individual 90 minutes after consumption of test snack, which test snack had been consumed on an empty stomach, i.e., three hours before the test lunch. The same blood analysis is performed on blood samples taken from individuals who had consumed the control lunch and control snack composition. The results of the blood analyses are shown in Table 3, below.

TABLE 3

Pre- and Post-Consumption Plasma Tp/Lnaa Ratios After Consuming Test or Control Snack

| Group | Pre | Post | Increase |
| --- | --- | --- | --- |
| Test | $0.094 \pm 0.003$ | $0.111 \pm 0.004$ | 0.017 |
| Control | $0.087 \pm 0.006$ | $0.086 \pm 0.004$ | None |

Hence, the test group experienced a significant increase in its post-consumption plasma Tp/Lnaa ratio compared to that of the control group, which experienced no increase in the plasma Tp/Lnaa levels.

As an apparent consequence of the higher Tp/Lnaa ratio after consumption of the combined lunch or dinner and snack, although applicants do not wish to be limited by this theory, the test group also experienced a decrease in carbohydrate craving after consumption of the test meals. Subjects filled out a weekly self-report assessing, on a 10 point scale, their cravings for protein, carbohydrate, fat fruits and vegetables during the previous week. Only cravings for carbohydrate-rich foods were noted. Over the entire 7 week study the average rating of carbohydrate craving as compared to baseline decreased by 1.8 among the test subjects but did not change from baseline among the control subjects.

Thus, the weight loss plan of the present invention provides a statistically significant increase in the post-consumption plasma Tp/Lnaa ratio compared to the control group, as well as a statistically significant decrease in the carbohydrate craving of the test group relative to the control group. Such benefits were provided by the test compositions of the present invention, which allocated the daily carbohydrate and protein intake differently from existing diet plan compositions to ensure that the ratio of plasma tryptophan to that of circulating amino acids is elevated sufficiently to increase tryptophan uptake into the brain following consumption of the test lunch or dinner and the test snack.

Preferably, the breakfast and lunch compositions contains a carbohydrate:protein weight ratio of about 1:5 to about 5:1, more preferably about 1:2 to about 2:1, and most preferably about 1:1. Also, the dinner composition should preferably contain a carbohydrate:protein weight ratio of about 5:1 or higher, more preferably 7:1 or higher, and most preferably 10:1 or higher. The snack composition should be substantially free of protein, as stated above, and may include complex carbohydrates, simple sugars or both.

In a particular embodiment of the invention, the claimed package includes a breakfast composition that has a caloric content ranging from about 200 to about 400 calories, preferably, from about 250 to about 350 calories, and most preferably, from about 300 to about 325 calories. Its protein content can range from about 20 to about 50 grams, preferably about 25 to about 45 grams, most preferably about 30 grams. Its carbohydrate content can range from about 20 to about 60 grams, preferably about 30 to about 50 grams, most preferably about 40 grams. In addition, the breakfast composition of the present invention may also provide about 0 to about 10 grams of fat, preferably, about 0 to about 5 grams, most preferably, about 0 to about 2 grams, and about 0 to about 20 grams of fiber, preferably, about 1 to about 15, and most preferably, about 5 to about 10 grams.

In a particular embodiment of the invention, the claimed package includes a lunch or dinner composition that has a caloric content ranging from about 300 to about 500 calories, preferably, from about 325 to about 475 calories, and most preferably, from about 350 to about 425 calories. Its protein content can range from about 5 to about 35 grams, preferably about 5 to about 30 grams, most preferably about 10 to about 20 grams. Its carbohydrate content can range from about 50 to about 90 grams, preferably about 60 to about 80 grams, most preferably about 70 grams. In addition, the lunch or dinner composition of the present invention may also provide about 0 to about 15 grams of fat, preferably, about 3 to about 12 grams, most preferably, about 5 to about 8 grams, and about 0 to about 20 grams of fiber, preferably, about 1 to about 15, and most preferably, about 5 to about 10 grams.

In a particular embodiment of the invention, the claimed package includes a snack composition that has a caloric content ranging from about 150 to about 250 calories, preferably, from about 175 to about 225 calories, and in one aspect from about 200 to about 225 calories. Its protein content should preferably be less than 5 g, more preferably less than 2 g, i.e., most preferably a carbohydrate to protein ratio of 10 to 1 or greater. Its carbohydrate content can range from about 15 to about 100 grams, in one aspect about 40 to about 60 grams, in one aspect about 45 grams and in another aspect about 90 grams. In addition, the snack composition of the present invention may also provide about 0 to about 5 grams of fat, preferably, about 0 to about 3 grams, most preferably, about 0 to about 0.5 grams, and about 0 to about 20 grams of fiber, preferably, about 1 to about 15, and in one aspect, about 5 to about 10 grams.

Excluding the optional traditional meal, a preferred package of the invention should provide a caloric content ranging from about 700 to about 1200 calories. Furthermore, the package of the invention should preferably also provide instructions for the caloric and nutritional content of an optional traditional meal to be consumed for either lunch or dinner. With the optional traditional meal, the total caloric intake should not exceed about 1800 calories, preferably 1600 calories, more preferably 1400 calories, and most preferably, 1200 calories.

The present invention also provides a method of losing weight comprising substantially limiting an individual's daily caloric intake to no more than about 1400 calories for women and 1800 calories for men, which calories are provided by at least some form of carbohydrate intake and at least some form of protein intake, provided that about 40 percent or more of the protein intake is consumed at breakfast and lunch, preferably 50 percent, more preferably 60, most preferably 75 percent and even more preferably up to 100%.

In yet another embodiment of the invention, a method of maintaining body weight is disclosed, comprising replacing a conventional snack with a snack foodstuff comprising two or more rapidly digestible carbohydrates, which foodstuff, an aqueous suspension thereof, or an aqueous solution thereof has a pH equal to or greater than about 6, which foodstuff is substantially free of protein. After an individual has achieved a desired body weight, that body weight can be maintained by daily use of the snack foodstuff of the invention as a substitute for any other snack. Thereby, the calorie and fat consumption of the individual are controlled and limited. Maintaining body weight is understood to mean that the range of body weight over a three month period does not exceed 15%. Preferably, the change in body weight over a three month period does not exceed 6%. It is understood that extraordinary events can cause a temporary change in weight that do not in any way detract from the usefulness of this embodiment of the invention.

The methods of the present invention are particularly well suited for promoting weight loss by substantially limiting an individual's daily food intake to the contents of a package comprising a plurality of food compositions including at least one breakfast composition, at least one lunch or dinner composition, and at least one snack composition, the breakfast composition comprising (a) at least one form of carbohydrate, and (b) at least one form of protein, the weight ratio in the breakfast composition of the total amount of carbohydrate to the total amount of protein ranging from about 1:10 to about 1:1; the lunch or dinner composition comprising (a) at least one form of carbohydrate, and (b) at least one form of protein, the weight ratio in the composition of the total amount of carbohydrate to the total amount of protein ranging from about 4:1 to about 10:1; and the snack composition comprising at least one form of carbohydrate and being substantially free of protein, and, optionally, a traditional meal of a prescribed range of caloric and nutritional content to be consumed either at lunch or dinner, the contents of the package providing, along with the optional traditional meal, a daily caloric intake falling within a predetermined range, say about 1200 to about 1800, preferably, about 1200 to about 1600, more preferably, about 1300 to about 1400.

And in yet another application of the present invention, a method is provided for inhibiting the carbohydrate craving of an individual participating in a weight loss diet plan comprising limiting substantially an individual's daily food intake to a plurality of packaged compositions comprising at least one breakfast composition, at least one lunch composition, and at least one snack composition, the breakfast composition comprising (a) at least one form of carbohydrate, and (b) at least one form of protein, the weight ratio in the breakfast composition of the total amount of carbohydrate to the total amount of protein ranging from about 1:10 to about 1:1; the lunch or dinner composition comprising (a) at least one form of carbohydrate, and (b) at least one form of protein, the weight ratio in the composition of the total amount of carbohydrate to the total amount of protein ranging from about 4:1 to about 10:1; and the snack composition comprising at least one form of carbohydrate and being substantially free of protein, and, optionally, a traditional meal of a prescribed range of caloric and nutritional content consistent with a dietary weight loss plan to be consumed either at lunch or dinner, the contents of the plurality of packaged compositions providing, along with the optional traditional meal, a fixed daily caloric intake falling within a predetermined range.

In another embodiment the invention comprises a method of treating gastric hyperacidity associated with obesity comprising consuming one or more replacement snacks as a substitute for a meal or another snack, which snack or a mixture thereof with water has a pH equal to or greater than about 6, whereby gastric hyperacidity is ameliorated. Moreover, in a preferred embodiment, of the method the replacement snack comprises two or more rapidly digestible carbohydrates, which snack is substantially free of protein.

The following examples are further provided.

EXAMPLES

1. Weight Loss Plan

Sixty-two women weighing between 40–60 pounds above medically desirable weight are recruited to enter a 7-week weight loss study. All the subjects are first subjected to a 3 week run-in period in which they received nutritional information and a low fat diet to eliminate the effect of participation in a weight loss plan from the effect of the weight loss intervention itself. After this three week run-in period, the subjects are assigned randomly to one of two isocaloric formula diets.

Both diets provided approximately 1350 calories daily. The control diet followed the dietary guidelines and nutrient composition of Ultra Slim Fast®. Briefly, the control diet contains approximately 3 parts carbohydrate to one part protein at every meal and snack. The experimental/test plan of the present invention allocated the amounts of protein and carbohydrate differently at each meal and snack to ensure that following the lunch and dinner meals, the ratio of plasma tryptophan to that of the circulating large neutral amino acids is not decreased so that the ratio would be significantly elevated following the consumption of the carbohydrate-rich snack.

The breakfast, lunch, and snack meals are provided in powder form and reconstituted with either water, diet soda, or coffee. The dinner meal is composed of traditional foods but the subjects are given strict guidelines that restrict their food choices at this optional traditional dinner meal according to the guidelines of each diet plan. The study is carried out in a double blind format. Each of the subjects are weighed weekly, and their blood pressure, moods, cravings, and ability to adhere to the diet plan are monitored. Twenty-one out of 33 subjects on the experimental diet plan are found to complete the study, whereas 19 out of 30 are found to complete the control diet plan. Both groups lost weight as a whole, see Table 4.

TABLE 4

| Baseline Weight | Final Weight | Pearson's correlation |
|---|---|---|
| Experimental Diet | | |
| 181 ± 2.62 | 177 ± 1.10 | ($p < 0.0001$)* |
| Control Diet | | |
| 187 ± 3.3 | 183 ± 1.44 | ($p < 0.0011$)* |

Changes in the mood of each subject over the 7-week study are also monitored using the Profile of Mood States, which is a self-rating form describing several mood states. McNair, D., et al., in Profile of Mood States (Manual), San Diego, Calif. Educational Testing Service (1971) pp. 5–29.

It is also found that there is a significant difference in the overall rating of vigor between the two groups, the experimental group rating themselves as significantly more vigorous ($p<0.03$) than the control group, using an Analysis of Variance to do the analyses.

2. Snack Food Composition

A typical snack composition (formula #1) can include maltodextrin (35 grams), dextrose (14.5 grams), Penplus UM Starch (3.0 grams), niacinamide (5.0 milligrams), and pantothenate (2.5 milligrams), calcium (500 milligrams), and magnesium (200 milligrams). The snack composition, as well as the other food compositions, may also contain vitamins A, D, E, B-1, B-2, B-6, B-12, and/or C. The snack composition may also contain added fiber (e.g., circa 10 grams of methylcellulose or the like). A buffer for pH can be included to adjust natural acidity so that the resultant pH is equal to 6 or higher.

According to a preferred embodiment, the snack food composition has an orange/cream flavor, contains 182.2 calories, including 2.4 calories from fat, and includes 63.48 g of carbohydrate, 7.75 g of fiber and 0.25 g of fat in one 8 oz serving with water. Optionally, this composition may also include vitamins and other supplements such as calcium.

The compositions of other preferred and suitable variations in the snack composition are provided in Table 5. It is understood that the compositions have a pH, or that their pH is adjusted to be, about 6 or greater.

TABLE 5

COMPOSITIONS SUITABLE FOR PREPARATION OF THE SNACK FOOD COMPONENT OF THE PRESENT INVENTION

| ingredient | formula #2 amounts (g) | formula #3 amounts (g) | formula #4 amounts (g) |
|---|---|---|---|
| maltodextrin | 35 | 38 | 33 |
| dextrose | 10.5 | 14 | 16 |
| sucrose | 2.0 | — | — |
| Penplus UM Starch | 3.0 | 3.5 | 2.8 |
| H & R Orange | 0.09 | — | 0.09 |
| WJ Yellow No. 6 | 0.03 | 0.03 | 0.01 |
| Niacinamide | 0.005 | — | 0.005 |
| pantothenate | 0.0025 | — | — |
| thiamine | — | 0.0005 | 0.0005 |
| calcium phosphate | 0.50 | — | 0.50 |
| magnesium phosphate | 0.20 | 0.40 | 0.1 |

3. Large Scale Preparation

Large scale methods for preparation of the composition of the invention will be apparent to one skilled in the art.

4. Weight Loss Methods

A non-acid weight loss program is disclosed, based on the compositions of the invention, i.e., a non-acid mixture of dietary carbohydrates which elevate brain serotonin levels, thereby enhancing satiety and suppressing the desire to snack on carbohydrate- and fat-rich foods, that utilizes multiple channels to promote weight loss in overweight and obese men and women who may suffer from gastric hyperacidity, acid reflux, or both. This program is generally useful to treat individuals suffering from a carbohydrate craving universally complained of by individuals on a diet, as well as for the treatment of overeating in individuals suffering from stress, PMS, menopausal symptoms, "winter blues", binge eating, smoking withdrawal, alcohol withdrawal, mild pain/itch, sideffects of various psychotropic drugs, and to promote sleep.

1. Use of composition to treat individuals suffering from gastric distress

Major components of the non-acid weight loss program include the composition of the invention having pH 6 taken twice each day as a beverage; education about nutrition and portion control; physical training with a qualified trainer; and individual and group counseling sessions.

In a small study involving five patients treated for twelve weeks, weight loss was comparable to that occurring with an acidic carbohydrate-based weight-loss beverage (0.91 pounds per week for the non-acidic, and 0.83 pounds per week for the acidic beverage). The acidic beverage group used acidic snack compositions according to U.S. Pat. No. 5,595,772. None of the patients complained of gastric distress when taking the non-acidic formulations. (One of the five had been completely unable to utilize the original, acidic drink, even if she also took Prilosec, an anti-ulcer drug. Two of the others stated that they had experienced gastric distress with the acidic drink, and had "treated" it by eating more foods, a counterproductive activity.)

The mechanism by which the compositions of the invention enhance satiety and suppress the tendency of very many overweight people to snack heavily on carbohydrate-rich and fat-rich foods involves the ability of those carbohydrates to produce a significant and reproducible increases in the rates at which brain neurons synthesize and release the neurotransmitter serotonin. This effect starts within minutes of the time the subject drinks the beverage composition of the invention and lasts for 3 or more hours. The particular carbohydrates in the composition cause insulin to be secreted; this hormone, in turn, changes the levels of amino acids in the blood stream causing one of them—tryptophan—to be taken up to the brain, where it is converted to serotonin. This arise in serotonin also occurs when people eat normal meals, and is one of the most important mechanisms that causes people to stop being hungry. It can also improve the mood, making people feel less depressed and anxious.

However, normal meals, unlike the composition of the invention may also contain large amounts of fat, which tends to increase body weight, or of proteins, which block the rise in brain serotonin. Thus it is necessary to use a fat-free and protein-free preparation. A frequent cause of obesity is "carbohydrate carving"—the tendency of people to use dietary carbohydrates as though they were a drug, because the carbohydrates relieve their feelings of depression and anxiety by increasing brain serotonin.

Thus, the composition of the invention exhibits many advantages over other weight-loss products, including, but not limited to the following: It is a natural, food-based product. It can be taken regardless of what medications the subject might also be taking. (It should not, however, be used by people with diabetes.) It is not associated with tolerance or addiction potential, and people do generally not exhibit rebound eating after it is withdrawn. Its satiety-promoting effect helps users to control the size of the food portions they actually choose to eat, —thus facilitating adherence to low-calorie food plans. Its mode of presentation (9 oz of liquid) makes it highly unlikely that it will be used for bingeing. It has no known side-effects; there are no limitations on the duration of the treatment; and it is safe for any age group.

2. Use of composition to treat individuals carving carbohydrates

In each example, except as indicated, the efficacy of the composition is demonstrated by administering it or its placebo, i.e., a nutrient mixture that also contains sufficient protein to block the carbohydrate-induced rise in brain serotonin levels. The experiments use a crossover design in which each subject serves as his/her own control, receiving, at random, the active or the placebo composition twice daily (before lunch or dinner) for two weeks. Various standardized indices of mood (Hamilton Depression Test, POMS Test, VAMS Test, Stanford Sleepiness Scale) are administered after one or two weeks of treatment, at intervals, e.g., 1, 2 and 4 hours, after consumption of the test preparation. Subjects are also weighted initially and at one or two weeks after each treatment (active or placebo), and are also interviewed briefly and asked about their eating behavior, e.g., carbohydrate-craving and fat-craving.

STRESS Subjects who claim that they experience stress on a daily basis are evaluated for 4 weeks using a self-report that keeps track of the individual's usual sources of stress (self reported personal stress inventory). Subjects rate the frequency of the stressful events occur daily and on a scale of 1–5, evaluate the intensity of the stress. Subjects fill out the CES-D which is a self reported scale of anxiety and depression. This is done daily as well. Subjects who indicate a consistent level of stressful events daily determined by at least 2 events occurring per day and who rate in the mild to moderate anxiety level on the CES-D participate in a test of the carbohydrate intervention on daily stress. Subjects are given either the composition of the present invention formulated as a drink or its placebo (a drink that did not elevate serotonin levels) for two weeks and then switch to the alternate drink for another two weeks in their cross over design. The drinks are consumed an hour before lunch and between 4 and 6 PM. Subjects are asked to fill out the self reported personal stress inventory on a daily basis and also take the CES-D on a daily basis. The stress scores and CES-D scores are compared for each subject while on the carbohydrate drink and on the placebo. Subjects on psychotropic drugs or other drugs that might alter behavior are excluded from the study as are smokers and recreational drinkers.

MENOPAUSAL SYMPTOMS A special formulation is made that includes both the composition described in the present invention and other ingredients designed to ameliorate other, related symptoms, e.g., pain, mild cognitive disturbances. The placebo is a protein-rich formulation of similar taste and lacking the other active ingredients. Subjects receive the active or the placebo preparation for four randomized periods of one month each. The assessment of their responses is by interview and using the tests described above.

WINTER BLUES Subjects exhibiting the characteristic loss of energy, hypersomnia, sadness, and tendency to weight gain, starting in November each year, receive the composition or the placebo for four randomized one-month periods, and tested as above.

BINGE EATING This example evaluates the effect on the carbohydrate drink on individuals both obese and of normal weight who eat at least 50% more than they normally eat in a very short period of time at least twice a week. This is not a study of binge eating disorder, but more a common problem of intermittent overeating. A screening period of two weeks takes place in which individuals claiming a tendency to binge frequently keep track of their food intake. Subjects who report an excessive food intake compared to their own normal food intake enter the study. Subjects who suffer from eating disorders or are on medications that might alter eating behavior are excluded from the study. The subjects are their own controls and participate in a cross over study in which they are randomly assigned to receive the carbohydrate drink or its placebo during that time of day when they are most likely to binge. They are told to consume the drink an hour before their normal binge time on an empty study and keep track of their binges and their food intake during the binges during the two week testing periods.

SMOKING WITHDRAWAL Coincident with smoking withdrawal, subjects start to consume the composition twice daily, just prior to the daily predetermined periods when they anticipate the greater difficulty in continuing not to smoke. Subjects are pair-matched, based on degree of obesity and on whether or not they are also taking nicotine or another drug for smoking withdrawal, the other member of the pair is given the placebo preparation. Treatment is continued for two-months. Patients are weighed and interviewed every two weeks.

ALCOHOL WITHDRAWAL Subjects are selected based on their desire to suppress weight gain, carbohydrate-craving and mood changes that often occur in otherwise normal individuals who are trying to decrease their weekly consumption of alcoholic beverages, but do not perceive themselves as requiring the rigor of a formal program like AA. Pair-matched subjects receive either the active or the placebo preparation for two-months, and tested as above.

SLEEP ONSET Normal volunteers and people who allege that they often have difficulty falling asleep, will be tested, after receiving the active or placebo preparation, at home, using wrist actigraphy. The data stored in the actigraph is analyzed to determine whether consumption of the active or the placebo preparation thirty minutes before bedtime decreases the amount of time before the subjects fall asleep (as demonstrated by a near-cessation of motor activity).

Accordingly, it should be apparent to one of ordinary skill in the art that other embodiments of the present invention can be made without departing significantly from the scope and spirit of the disclosed invention, which invention should not be construed as being limited to any of the specific examples provided, and which invention is limited only by the claims that follow.

We claim:

1. A method of weight loss for a male individual comprising consuming a foodstuff which comprises two or more rapidly digestible carbohydrates, which foodstuff or a mixture thereof with water has a pH equal to or greater than about 6, which foodstuff is substantially free of protein, and substantially limiting a daily caloric intake of said male individual to about 1800 calories or less, whereby said male individual loses weight.

2. A method of weight loss for a female individual comprising consuming a foodstuff which comprises two or more rapidly digestible carbohydrates, which foodstuff or a mixture thereof with water has a pH equal to or greater than about 6, which foodstuff is substantially free of protein, and substantially limiting a daily calorie intake of said female individual to about 1400 calories or less, whereby said female individual loses weight.

3. A method of weight loss for an individual comprising consuming a foodstuff which comprises two or more rapidly digestible carbohydrates, which foodstuff or a mixture thereof with water has a pH equal to or greater than about 6, which foodstuff is substantially free of protein, whereby the foodstuff is a replacement for one or more meals or snacks and said individual loses weight.

4. A method of weight loss for an individual, wherein said individual suffers from gastric hyperacidity or gastroesophageal reflux, comprising consuming a foodstuff which comprises two or more rapidly digestible carbohydrates, which foodstuff or a mixture thereof with water has a pH equal to or greater than about 6, which foodstuff is substantially free of protein, whereby said individual loses weight.

5. A method of weight loss for an individual comprising consuming a foodstuff which comprises two or more rapidly digestible carbohydrates, which foodstuff or a mixture thereof with water has a pH equal to or greater than about 6, which foodstuff is substantially free of protein, and consuming about 90% of daily protein at breakfast and lunch, whereby the individual loses weight.

6. A method of weight loss for an individual comprising consuming a foodstuff which comprises two or more rapidly digestible carbohydrates, which foodstuff or a mixture thereof with water has a pH equal to or greater than about 6, which foodstuff is substantially free of protein, and which foodstuff comprises about 30–40 g maltodextrin, about 10–18 g dextrose, about 1–5 g starch, or combinations thereof, whereby said individual loses weight.

7. A method of treating gastric hyperacidity associated with obesity comprising consuming one or more replacement snacks as a substitute for a meal or another snack, wherein said replacement snack or a mixture thereof with water has a pH equal to or greater than about 6, whereby gastric hyperacidity is ameliorated.

8. The method of claim 7 in which the replacement snack comprises two or more rapidly digestible carbohydrates, which snack is substantially free of protein.

9. The method of claim 7 in which the pH is less than about 8.

10. A method of treating gastroesophageal reflux comprising consuming one or more replacement snacks as a substitute for a meal or another snack, which snack or a mixture thereof with water has a pH equal to or greater than about 6, whereby gastroesophageal reflux is ameliorated.

11. A method of maintaining body weight comprising replacing a conventional snack with a snack foodstuff comprising two or more rapidly digestible carbohydrates, which foodstuff or a mixture thereof with water has a pH equal to or greater than about 6, which foodstuff is substantially free of protein, whereby the body weight is maintained.

12. A method of weight loss for a male individual, comprising consuming a foodstuff which comprises two or more rapidly digestible carbohydrates and a pH buffer, which foodstuff or a mixture thereof with water has a pH equal to or greater than about 6, and which foodstuff is substantially free of protein, and limiting a daily caloric intake of said male individual to about 1800 calories or less, whereby said male individual loses weight.

13. A method of weight loss for a female individual, comprising consuming a foodstuff which comprises two or more rapidly digestible carbohydrates and a pH buffer, which foodstuff or a mixture thereof with water has a pH equal to or greater than about 6, and which foodstuff is substantially free of protein, and limiting a daily caloric intake of said individual to about 1400 calories or less, whereby said female individual loses weight.

14. A method of weight loss for an individual, whereby said individual has a gastric hyperacidity or a gastroesophageal reflux, comprising consuming a foodstuff which comprises two or more rapidly digestible carbohydrates and a pH buffer, which foodstuff or a mixture thereof with water has a pH equal to or greater than about 6, and which foodstuff is substantially free of protein, whereby said individual loses weight.

15. A method of weight loss for an individual, comprising consuming a foodstuff which comprises two or more rapidly digestible carbohydrates and a pH buffer, which foodstuff or a mixture thereof with water has a pH equal to or greater than about 6, and which foodstuff is substantially free of protein, and consuming about 90% of daily protein at breakfast and lunch, whereby said individual loses weight.

16. A method of weight loss for an individual, comprising consuming a foodstuff which comprises two or more rapidly digestible carbohydrates and a pH buffer, which foodstuff or a mixture thereof with water has a pH equal to or greater than about 6, wherein said foodstuff comprises about 30–40 g maltodextrin, about 10–18 g dextrose, about 1–5 g starch, or a combination thereof, and which foodstuff is substantially free of protein, whereby said individual loses weight.

17. A method of maintaining a body weight, comprising replacing a conventional snack with a snack foodstuff comprising two or more rapidly digestible carbohydrates and a pH buffer, which snack foodstuff or a mixture thereof with water has a pH equal to or greater than about 6, and which snack foodstuff is substantially free of protein, whereby a body weight is maintained.

18. A composition comprising about 20–100 g of a rapidly digestible carbohydrate blend in solution and a pH buffer, wherein said solution has a ratio of water to said carbohydrate blend of about 3–12 milliliters of water to about 1 g of said carbohydrate blend, said solution has a pH equal to or greater than 6, and said solution is essentially free of protein.

19. The composition of claim 18, wherein said carbohydrate blend comprises a galactose, a dextrose, a mannose, a sucrose, a maltose, a lactose, a dextrin, a maltodextrin, or a mixture thereof.

20. The composition of claim 18, wherein about 60–100% of said carbohydrate blend is a dextrose, a dextrin, a maltodextrin, or a mixture thereof.

21. The composition of claim 18, wherein about 0–40% of said carbohydrate blend is a starch, a pre-gelatinized starch, or a mixture thereof.

22. The composition of claim 18, wherein said solution further comprises a compound selected from the group consisting of a vitamin, a tryptophan, a tyrosine, an ovarian hormone, a detoxifying agent, and a diuretic.

23. The composition of claim 18, wherein said solution contains no more than 1–2 g of fat.

* * * * *